United States Patent [19]
Devenyi

[11] Patent Number: 5,636,549
[45] Date of Patent: Jun. 10, 1997

[54] WIRE WOUND THREADED ELEMENTS INCLUDING LEAD SCREWS, ROLLER NOT ASSEMBLIES AND PROCESS

[75] Inventor: Gabor Devenyi, Pentang, Canada

[73] Assignee: Hughes Electronics, Los Angeles, Calif.

[21] Appl. No.: 179,595

[22] Filed: Dec. 22, 1993

[51] Int. Cl.⁶ .................... F16H 25/24; B21H 3/02
[52] U.S. Cl. .................... 74/89.15; 74/424.8 R; 74/459; 411/411; 470/10
[58] Field of Search .................. 74/424.8 R, 459, 74/89.15; 411/378, 411, 412, 438; 470/9, 10

[56] References Cited

U.S. PATENT DOCUMENTS

| | | | |
|---|---|---|---|
| 306,473 | 10/1884 | Findlay | 411/411 X |
| 534,164 | 2/1895 | Larsh | 411/411 X |
| 1,181,971 | 5/1916 | Lovell | 470/9 X |
| 1,231,643 | 7/1917 | Parnall | 411/411 X |
| 1,780,825 | 11/1930 | Kuhn | 411/411 X |
| 2,585,304 | 2/1952 | Evans et al. | 411/411 X |
| 2,616,302 | 11/1952 | Wahlmark | 74/459 |
| 3,071,022 | 1/1963 | Strandgren | 74/458 |
| 3,350,811 | 11/1967 | Bender | 411/412 X |
| 3,688,852 | 9/1972 | Gaylord et al. | 411/411 X |
| 4,226,129 | 10/1980 | Henderson | 74/89.15 |
| 5,101,213 | 3/1992 | Harada et al. | 411/411 X |

FOREIGN PATENT DOCUMENTS

| | | | |
|---|---|---|---|
| 2370202 | 6/1978 | France . | |
| 812487 | 8/1951 | Germany | 411/411 |
| 2311500 | 2/1973 | Germany . | |
| 8713708 | 11/1987 | Germany . | |
| 273780 | 6/1927 | United Kingdom . | |
| 408608 | 4/1934 | United Kingdom . | |
| 1117353 | 6/1968 | United Kingdom . | |

*Primary Examiner*—Allan D. Herrmann
*Attorney, Agent, or Firm*—Michael W. Sales; Wanda K. Denson-Low

[57] ABSTRACT

Producing novel threaded members such as lead screws (10, 20) by winding and anchoring a hardened tempered spring wire (14, 16) around a support body such as a screw shaft (11, 15) to form a hard, smooth thread comprising a wear-resistant running surface for engagement with a bearing nut member (43) in an adjustment assembly (30), such as for a zoom lens. The shaft (11) may be shallow-grooved (13) to determine the pitch of the threads. Alternatively the shaft (15) may be wound with contacting thread wire (16) and spacer wire (17) to determine the pitch of the thread.

13 Claims, 2 Drawing Sheets

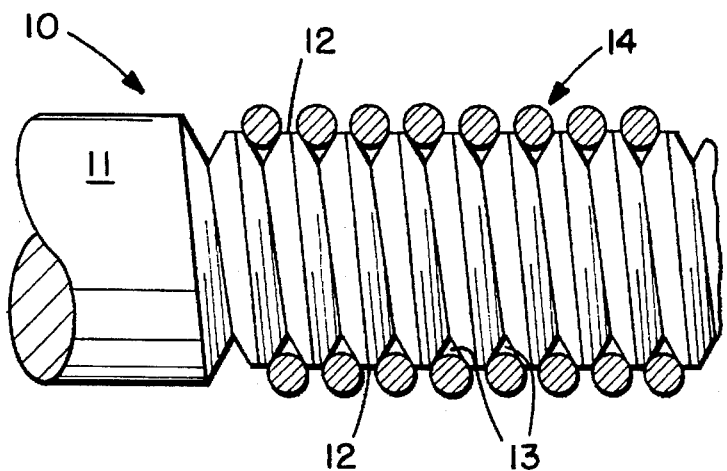
FIG. 1.
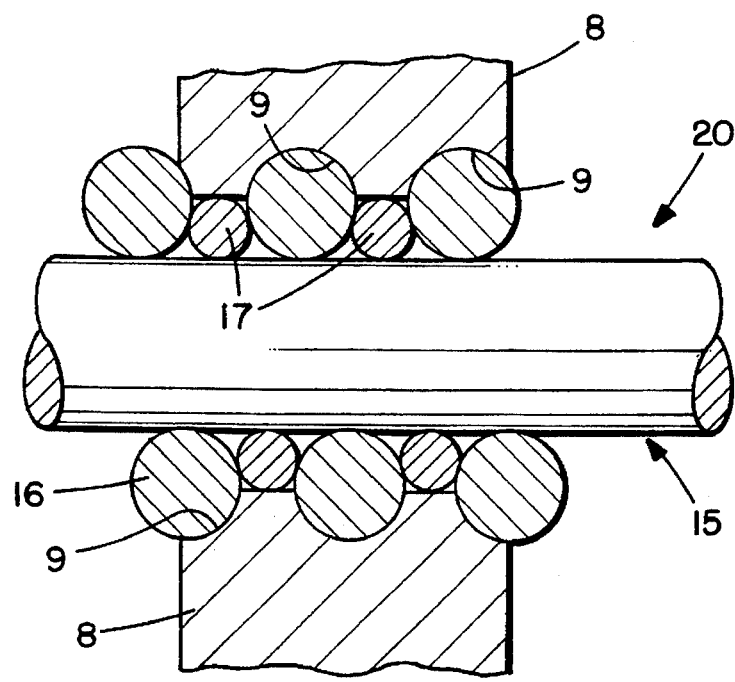
FIG. 2.
FIG. 3.
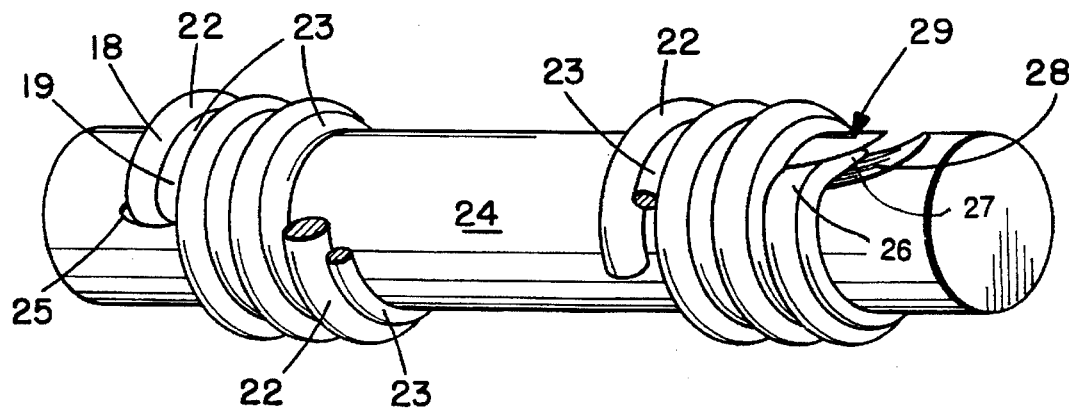

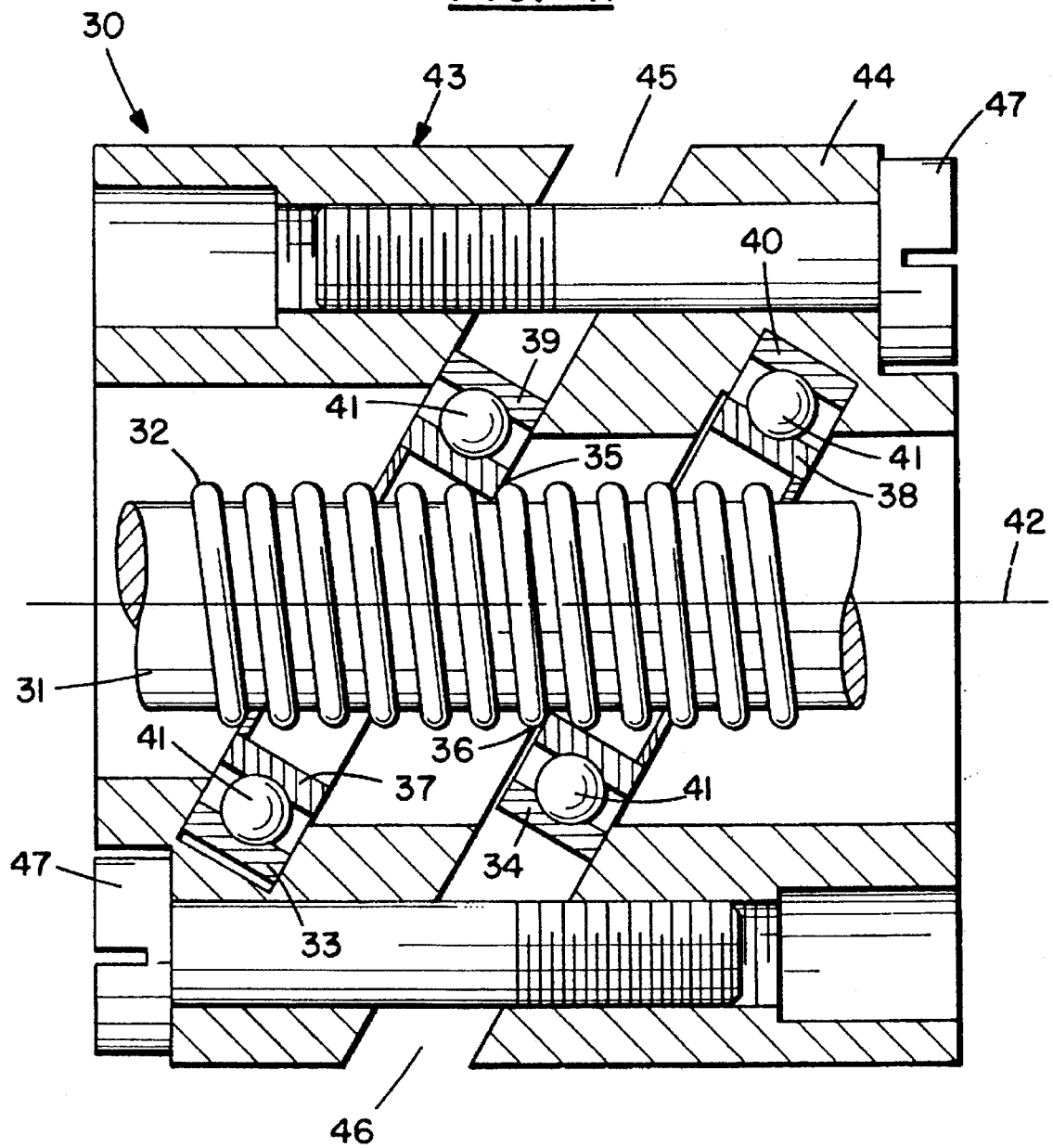

WIRE WOUND THREADED ELEMENTS INCLUDING LEAD SCREWS, ROLLER NOT ASSEMBLIES AND PROCESS

BACKGROUND OF THE INVENTION

The present invention relates to the production of threaded screw elements including elements having shafts of small diameter or large diameter, solid or hollow, metallic or plastic, rigid or flexible, and to nut assemblies thereof such as drive assemblies for converting rotary motion of the screw element or of the nut member to relative linear displacement. Such drive assemblies are useful for the rapid, smooth and precise adjustment of linear mechanisms, such as zoom lenses, by automatic screw-turning or nut-turning means.

Conventional lead screws are formed by machine-cutting threads into the surface of a rigid metal shaft. In order for the threads to be resistant to frictional wear during use, resulting in loss of precision, the metal shaft must be solid and rigid and formed of hardenable metal, the screw must be hardened after the thread is formed, and the thread grooves must be ground in order to produce a sufficiently accurate lead surface. These operations are tedious and time-consuming, require the use of a metal shaft having a diameter which is not too large or too small for machine-cutting, and result in rigid lead screws which are not as wear-resistant or smooth-operating as desired, particularly in the absence of lubrication. Conventional lead screws are assembled with recirculating ball nuts and are limited to the thread pitch being relatively coarse in order to accommodate the recirculating steel balls, which coarse thread does not permit direct adjustment drive by means of a small D.C. motor. Such automatic drive is desirable for applications where rapid adjustment is necessary.

Also, conventional lead screws have the entire shaft formed of the same hardenable metal required for the threaded surface. Since the bulk of the lead screw is present in areas other than the motion-imparting thread area, it is desirable to be able to form such other areas of the screw from materials which are less expensive and easier to form, such as of molded plastics or softer metals.

SUMMARY OF THE INVENTION

The present invention relates to a novel process for producing novel threaded shafts, such as lead screws, by winding a length of hardened, tempered spring wire of the desired metal composition around a shaft of predetermined length and diameter or circumference to form wire convolution threads having the desired pitch, and securing the ends of the wire length to the shaft to form the threaded shaft. The shaft may be rigid or flexible, solid or hollow, large or small diameter, formed from inexpensive, easily-worked composition, such as plastic, soft metal, wire cable, metal or plastic pipe, wood, etc., and the thread portion of the screw which makes frictional or roller engagement with a nut, ball nut or bearing-containing travel housing or payload is the only portion which is formed from the hardened, tempered spring wire which is relatively expensive but is easy to apply and requires no post-hardening or grinding treatment.

The present invention comprises two preferred processing embodiments. According to the first embodiment the screw shaft is preformed to have a shallow thread groove or recess into which the lead wire is wound under tension to form a wire thread having the desired pitch, as guided by the preformed shallow thread groove. Thereafter the ends of the wire are mechanically-anchored to the shaft to produce the desired lead screw.

According to the second embodiment, a smooth shaft is used, and two wires are simultaneously wound therearound under tension, one wire being a larger diameter carrier or thread wire of hardened tempered spring wire, and the other wire being a smaller diameter spacer wire which contacts adjacent convolutions of the larger carrier or thread wire to set the pitch of the screw threads. The ends of both wires are secured to the shaft to produce the lead screw. The spacer wire does not form a nut-engaging thread surface and therefore it need not be formed of hardened, tempered spring wire.

THE DRAWINGS

FIG. 1 is a diagrammatic cross-section, to an enlarged scale, of a lead screw according to one embodiment of the present invention, in which the shaft is pre-grooved;

FIG. 1 is a diagrammatic cross-section, to an enlarged scale, of a lead screw-nut assembly according to another embodiment of the invention, in which the shaft is smooth and the wire threads include wire spacers;

FIG. 3 is a partial perspective view, to an enlarged scale, of a lead screw according to FIG. 2 illustrating means for anchoring the ends of the wires to the shaft, and FIG. 4 is a cross-sectional view, also to an enlarged scale, of a lead screw-bearing nut assembly according to a preferred embodiment of the invention.

DETAILED DESCRIPTION

Referring to the embodiment of FIG. 1 of the drawings, the lead screw 10 thereof comprises a cylindrical shaft 11 having a pre-grooved shallow-truncated thread portion 12 comprising a shallow thread-like helical groove or track 13 designed to receive or seat, space and orient a tightly-wound hardened, tempered spring wire 14 which forms the smooth, hard, spaced thread convolutions which are designed to provide wear-resistant engagement with a nut member, such as in a precision drive assembly of a zoom lens. The leading and trailing ends of the wire are anchored or secured to the shaft by any suitable means, which will depend upon the composition of the shaft. The shaft may be formed from inexpensive, easily-worked materials such as a soft metals, molded plastics such as of nylon or ABS or other materials, since the shaft merely supports the durable wire thread and makes no contact with the nut member during the adjustment or travel operations.

The pre-formed helical groove or track 13 is formed in conventional manner which will depend upon the composition of the shaft 11. Thus the shaft can be cast or molded to contain the desired truncated thread portion 12, or a smooth metallic shaft can be threaded by conventional thread-cutting means and the tips of the threads can be ground to form the truncated thread portion 12. The track or groove 13 has the desired pitch, or number of convolutions per linear inch, to impart the desired pitch to the wire thread wound thereover.

The winding of the wire 14 under tension around the shaft thread portion 12 can be done automatically, using conventional wire-winding devices such as a shaft attachment which revolves or rolls around the shaft and dispenses and deposits a continuous length of the desired wire under tension along the helical track 13, after which the leading and trailing ends of the wire are secured to the screw shaft 11.

Referring to the embodiment of FIG. 2 of the drawings, a lead screw 20 comprising a smooth cylindrical lead screw shaft 15 is simultaneously wound with contacting convolutions of a hardened, tempered spring wire, which forms threads 16, and a spacer wire 17 of smaller diameter than the hard wire, forming the spacer convolutions 17. The spacer wire convolutions 17 can be formed from less expensive composition than the wire used for the threads 16 since wire 17 merely serves to space and set the pitch of the durable threads 16 and does not a make any friction contact with the female thread 9 of the nut 8, or with the flat, truncated areas therebetween, of the adjustment assembly. Similarly, the composition of the shaft 15 is not critical, as with shaft 11 of FIG. 1.

The wires 16 and 17 may be simultaneously wound onto the shaft by means of a conventional wire-winding device which dispenses and winds the contacting wires under tension and at the same feed rate, after which the leading and trailing ends of each wire are secured to the shaft 15. The pitch of the threads 16 can be varied by the use of thread wires 16 and spacer wires 17 of different relative diameters. Referring to FIG. 2, the use of smaller or larger diameter spacer wire 17 causes the space between hard wire threads 16 to decrease or increase, respectively, thereby changing the pitch of the thread 16. This enables wire wound lead screws to be produced with precision accuracy approaching that of profile ground lead screws but at substantially-reduced cost and production time.

In the assembly of FIG. 2, the nut element 8 may be molded from suitable plastic composition, such as Nylon, Delrin, Circon, ABS or other suitable material, with the predetermined female thread portion 9, spaced by flat or truncated portions, molded in situ. In the assembly of FIG. 2, the nut member 8 is under less stress and friction due to the novel thread design and reduced contact area as compared to the high stress and frictional engagement between conventional nut and bolt threads. FIG. 3 illustrates means for securing or anchoring the leading ends 18 and 19 and the trailing ends 26 and 27 of a hard thread wire 22 and a spacer wire 23 tension-wound onto smooth screw shaft 24, according to one embodiment of the present invention. The shaft 24 is provided with a through bore 25 into which the leading end 18 of the thread wire 22 and the leading end 13 of spacer wire 23 are inserted and locked, such as by means of an epoxy cement. The wires 22 and 23 are wound in contacting relation over the smooth surface of the shaft 24, either manually or automatically, and the trailing ends 26 and 27, respectively, are drawn into a transverse slot 28 cut at an angle into the shaft 24 and locked into place, such as by bending the tab portion 29 of the cut shaft 24 into the slot 28 and against the trailing ends 26 and 27. Also, the trailing ends 26 and 27 can be secured within the slot 28 by means of epoxy cement. Various other anchoring or bonding means will be apparent to those skilled in the art, in the light of the present disclosure, depending upon the composition of the screw shaft, including an adhesive shaft surface to which the undersurfaces of the wires adhere or a thermoplastic shaft surface to which the undersurfaces of the wire bond when heated.

As will be apparent to those skilled in the art, the shaft 24 of FIG. 3 may be formed of substantially any composition, may be a small-diameter flexible member such as a wire cable, may be a large diameter hollow member such as a metal or plastic pipe or conduit or a cylindrical housing, such as for an elevator, and may have a narrow wall thickness which will not permit the cutting of threads thereinto.

Thus, the present assemblies may comprise a flexible elongated plastic rod or tube, or flexible elongated metal rod or tube, and wound with the tempered spring wire or wires to form the thread thereover, to provide a flexible or curved linear displacement assembly in which the flexible shaft can be rotated in place to cause the nut member to travel over a curved path, or in which the nut member can be rotated in place to cause the flexible shaft to travel over a curved path.

Since the present invention enables the application or attachment of tempered spring wire threads of any diameter around the outer periphery of a shaft or cylindrical housing of any diameter, it will be apparent to those skilled in the art that the present invention provides a means for producing linear displacement or relative travel between any housing, such as an elevator, having a nut or spaced bearing member supported therein, and a supporting shaft member which is helically would with the present tempered spring wires or cables for engagement with the nut or bearing members of the elevator. Rotation of the shaft, or in place rotation of the nut or bearing members, will cause the elevator to travel up or down the support shaft while restraining the elevator against free fall in the event of breakdown. In addition means can be provided for manual rotation of the shaft or nut or bearing members in the event of loss of electrical power.

FIG. 4 illustrates a preferred lead screw-bearing nut drive assembly in which the novel lead screws of the present invention can be used, to provide a simple, nearly play-free drive system suitable for high speed DC motor-controlled operation.

The leadscrew assembly, generally indicated at 30 in FIG. 4, includes a leadscrew 31 having an external wire-wound thread 32, first and second ball bearings, 33 and 34, respectively, disposed such that they contact first and second diametrically opposing portions 35 and 36, respectively, of the thread 32 of the leadscrew.

In the illustrated embodiment, each of the bearings, 33 and 34, respectively, includes an inner race, 37 and 38, respectively, and outer race, 39 and 40, respectively, each having a plurality of balls 41 disposed therebetween. Preferably, as discussed below, at least one edge, 42 and 43, respectively, of each of the inner races, 37 and 39, is chamfered.

The first and second bearings, 33 and 34, respectively, are disposed to accommodate the thread 32 of the leadscrew 31 by being tilted in accordance with the tracking angle of the thread 32 of the leadscrew 31 as well as the helix angle thereof. As used herein, the tracking angle of the thread 32 of the leadscrew 31 is that angle of each of the individual threads 32 with respect to the axis 42 of rotation of leadscrew 31. The helix angle is that angle that each of the threads 32 transverse to the axis 42 of the rotation of the leadscrew 31. In the preferred embodiment, the tracking angle of the leadscrew 31 is between 14 and 30 degrees although a 30 degree angle has been found to work particularly well. It will be understood by those skilled in the art, that the present invention will function more efficiently and accurately if the tracking angle and helix angle of the ball bearings, 33 and 34, are accurately located with respect to those corresponding angles of the leadscrew 31.

In one preferred embodiment, the disposition of the ball bearings, 33 and 34, is accomplished by means of a specially designed housing member 43 such as that shown in FIG. 4. As shown therein, the housing member 43 includes a body 44 that includes first and second slots, 45 and 46, respectively therein. In one embodiment, the ball bearings, 33 and 34, are positioned into the slots, 45 and 46, and generally secured therein by retention means 47 which can be, for example, bolts extending across the slots 45 and 46, that are tightened to pre-load the ball bearings, 33 and 34, against the leadscrew 31.

Another advantage of the present screw-making process is that it enables the production of screws having shafts which are not round in cross-section. Such screws are useful in cam mechanisms in which the thread surface of the screw e.g., having an elliptical cross-section engages a mating segmented thread surface of a movable member to cause the member to move up and down while it undergoes linear travel along the screw.

It will be understood that the present leadscrew assembly 30 is advantageous in that, at the point of engagement of the leadscrew 31 and the ball bearings 33 and 34 there in only a rolling contact between the components. Therefore, the wear is minimal. Further, friction is higher at the contact of the bearings, i.e., the inside diameter and shoulder of the inner race, and the leadscrew 31 than between the inner race and the outer race of the ball bearings. The leadscrew 31 drives the inner races, 39 and 40, while it is tracking the thread profile which in turn moves the housing, 43 of the bearings axially. The two ball bearings, 33 and 34, are loaded against the thread 32, or profile, of the leadscrew 31 and against each other. All the pre-load forces and additional axial loads are confined to the races of the two ball bearings. Further, lubrication of this leadscrew assembly 30 can be confined to the ball bearings only and, depending upon the speed for which the assembly is utilized, may not be necessary at all. Also, it will be understood that although the leadscrew assemblies 30 have been shown and discussed herein as having two ball bearings, a single ball bearing, for example, ball bearing 33 could also be used alone, or more than two ball bearing members may be used, biased or spring loaded against the thread, to provide a leadscrew assembly according to the principles of the present invention.

The leadscrew assembly 30 as described herein not only overcomes the drawbacks of conventional leadscrew assembly, but is capable of extreme precision.

Although the present invention has been discussed in detail with respect to one or more specific embodiments, it will be understood that other embodiments arrangements and configurations may be made without departing on the spirit and scope of the invention. Hence, the present invention is deemed limited only by the appended claims and the reasonable interpretation thereof.

I claim:

1. A threaded member comprising a support body having tightly wound over the surface thereof, and fastened thereto, a pair of contacting wires, one wire in said pair forming on said body a helical thread and being made of hardened tempered spring wire, the other wire in said pair being a smaller diameter spacer wire which contacts adjacent convolutions of said spring wire and controls the pitch of said thread.

2. A member according to claim 1 in which the support body comprises recessed areas which receive the leading and trailing ends of said spring wire to fasten said ends to said body.

3. A member according to claim 1 in which said support body comprises a molded or extruded plastic rod or pipe.

4. A member according to claim 1 in which said support body comprises an elongated, flexible cable, rod or pipe.

5. A member according to claim 1 in which said support body comprises a hollow cylindrical housing.

6. A member according to claim 1 in which said support body comprises a metal which is substantially softer than said spring wire.

7. A threaded member comprising a support body having a shallow helical groove with a desired pitch, and a spring wire is wound under tension onto said shallow helical groove to form a helical thread.

8. A screw member according to claim 7 in which said shallow helical groove comprises a truncated thread onto which said spring wire is wound to form convolutions of said spring wire which are spaced by a recessed convolution of said truncated thread.

9. An assembly comprising a screw member having a flexible support body having tightly wound over the surface thereof, and fastened thereto, a pair of contacting wires, one wire in said pair forming on said body a wear-resistant, rounded-surface helical thread and being made of hardened tempered spring wire, the other wire in said pair being a smaller diameter spacer wire which contacts adjacent convolutions of said spring wire and controls the pitch of said thread; and a nut member having a surface which engages said helical thread and moves therealong during relative rotation of said members.

10. An assembly according to claim 9 in which said nut member comprises a helical female thread having a rounded concave surface portion which mates with the helical thread of the support body to produce low stress, low friction engagement therewith.

11. An assembly according to claim 9 in which said nut member comprises at least one ball bearing member having an inner race which engages said helical thread and moves therealong during relative rotation of said members.

12. The process for producing a lead screw which comprises:

cutting a smooth shaft to receive a pair of wires, winding said pair of wires simultaneously around said shaft under tension to set the pitch of screw threads, and fastening said pair of wires to said shaft.

13. The process of claim 12 wherein said pair of wires comprises, a first wire being larger diameter carrier or thread wire of hardened tempered spring wire, and a second wire being a smaller diameter spacer wire which contacts adjacent convolutions of said first wire.

* * * * *